(12) United States Patent
Benedikt

(10) Patent No.: US 7,292,147 B2
(45) Date of Patent: Nov. 6, 2007

(54) OPTICAL DISK AND METHOD OF INTEGRATING A HIGH GAIN RFID ANTENNA

(75) Inventor: Mark Benedikt, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 216 days.

(21) Appl. No.: 10/949,668

(22) Filed: Sep. 24, 2004

(65) Prior Publication Data
US 2006/0071795 A1    Apr. 6, 2006

(51) Int. Cl.
G08B 23/00    (2006.01)
G11B 3/70     (2006.01)

(52) U.S. Cl. .................. 340/572.7; 340/572.8; 340/572.1; 369/273

(58) Field of Classification Search .......... None
See application file for complete search history.

(56) References Cited

U.S. PATENT DOCUMENTS

| | | | |
|---|---|---|---|
| 6,806,842 B2* | 10/2004 | King et al. | 343/795 |
| 7,031,470 B1* | 4/2006 | Bar-On | 380/203 |
| 2002/0032502 A1 | 3/2002 | Russell | |
| 2003/0028787 A1 | 2/2003 | Fayed et al. | |
| 2004/0052202 A1* | 3/2004 | Brollier | 369/273 |
| 2004/0054594 A1 | 3/2004 | Forster et al. | |
| 2006/0077062 A1* | 4/2006 | Andrechak et al. | 340/572.8 |

OTHER PUBLICATIONS

"Philips Semiconductors" on-line news, 2 pages, attached downloaded of product news from Philips; http://www.semiconductors.philips.com/news/content/file_1056.html; printed Jul. 27, 2004.

"Frequently Asked Questions about EPCgI" on-line information, 9 pages, attached downloaded of information; http://www.epcgloballinc.org/about/faqs.html; Printed Jul. 27, 2004.

* cited by examiner

Primary Examiner—Julie Bichngoc Lieu
(74) Attorney, Agent, or Firm—Vierra Magen Marcus & DeNiro LLP

(57) ABSTRACT

An optical disk comprises a disk substrate having a hub and an annular optical metallicized data region extending radially outward from the hub. The optical disk further comprises a radio frequency identification (RFID) transponder affixed to the disk substrate, e.g., within the non-data containing hub region. The optical disk further comprises at least one linear antenna element coupled to the transponder, e.g., via pole lead(s), and extending within the data region. The antenna element(s) can be applied to the disk substrate as a patterned antenna layer over a metallicized data region, and can be electrically isolated from the data region.

A method and system of identifying an optical disk is provided. A radio frequency (RF) signal can be transmitted to the optical disk at a range of at least five feet, and preferably at a range of at least ten feet. An RF signal with an identification code (e.g., a unique number) can be received from the optical disk in response to the transmitted RF signal. The activating RF signal can be transmitted by, and the identification RF signal can be received by, e.g., a handheld RF reader or an RF reader that is affixed to a building. The identification code can then be processed for many purposes, such as identifying the optical disk as a non-counterfeited optical disk, calculating a royalty, or tracking the location of the optical disk.

47 Claims, 5 Drawing Sheets

OPTICAL DISK AND METHOD OF INTEGRATING A HIGH GAIN RFID ANTENNA

FIELD OF THE INVENTION

The present invention relates generally to optical storage media and, in particular, to optical disks with embedded tracking devices and methods of integrating such tracking devices into optical disks.

BACKGROUND OF THE INVENTION

Radio frequency identification (RFID) technology is currently used for providing wireless automated identification of various devices. An RFID system generally includes a transponder called a "tag," which is carried by the device to be identified, and an radio frequency (RF) tag reader, which communicates with the transponder. In particular, the RF transponder, in response to a wireless interrogation signal transmitted by the RF tag reader via an antenna, wirelessly transmits an identification code back to the RF tag reader, which decodes the code and sends it onto a host processor or computer for identification of the device. RF transponders may either be passive, semi-passive, or active. Passive transponders parasitically obtain operating power from the wireless signal transmitted by the RF tag reader, whereas semi-active and active transponders obtain their power from on-board batteries.

RFID technology has many applications including: identifying aircraft in order to avoid collisions in the case of commercial aircraft or avoid friendly fire in the case of military aircraft; identifying employees at secured locations by placing a security card in close proximity to a card reader; and identifying optical media, such as compact disks (CDs), CD-ROMs, and digital versatile disks (DVDs). In the latter case, the incorporation of RFID technology into optical disks has been identified to be a solid value proposition opportunity in: i) on-the-disk anti-counterfeiting techniques whereby copy privileges are eliminated or limited when a specific code is read from the RFID transponder (assuming that the target optical drive has an RFID reader); ii) counterfeit detection at the point of entry into the destination country; iii) royalty tracking for content owners; and iv) supply chain track and traceability programs (assuming that the goods owner wants to track at the individual component level).

In the first scenario, the RFID reader need only be a few millimeters (e.g., 5 millimeters) from the RF transponder, which will typically take the form of a small passive integrated circuit (IC) chip mounted on the optical disk. Thus, the use of a low-gain antenna with the RF transponder, often times within the IC itself, which can be conveniently incorporated into the hub of the optical disk, will typically be sufficient to provide robust communication between the RF transponder and reader in this situation. In the last three scenarios, however, the RFID reader must be capable of communicating with the RF transponder from up to a few feet away. This is because the optical disks transported within the supply chain between the manufacturer and the retailer are typically packaged in cartons or "master packs", which will be further arranged on pallets. Thus, when scanning each pallet of optical disks, an RFID reader typically cannot be placed in close proximity to most, if not all, of the physical media.

Because the passive RF transponder chips currently incorporated into optical disks do not have the range necessary to activate in response to wireless signals received from the RFID reader a few feet away, the range of the RF transponder chip must be increased by either coupling an external portable power source in the form of a battery to the RF transponder chip (basically transforming it into a semi-passive or active transponder), or coupling a high gain antenna to the RF transponder chip.

The use of a battery on an optical disk, however, is not recommended for several reasons. First, the additional weight of the battery will tend to disrupt the delicate dynamic balance needed to rotate optical disks within disk drives at high speeds—typically at thousands of revolutions a minute. Second, batteries tend to leak their contents over time, resulting in damage to the optical disk, specifically the reflective surface. Third, batteries have a limited life, and thus, the efficacy of the RF transponder chip will be lost over time. Although this would not necessarily cause problems for royalty and supply chain tracking, which presumably would be accomplished before the end of battery life, any anti-counterfeiting functionality of the RF transponder chip would be lost once the battery was expired.

The option of coupling a high gain antenna to the RF transponder chip creates additional challenges. Unlike with other applications, such as tracking aircraft, where the space available for incorporating a relative large antenna is virtually unlimited, the space available on an optical disk is severely limited—not only by the limited total area of the optical disk, but also by desire not to adversely affect the data storage region of the optical disk (i.e., the concentric region of the disk from which data is optically read).

Besides enabling RFID transponders to be read from relatively great distances, it is also desirable to incorporate RFID technology into optical disks in a manner that is both tamper-proof and minimizes the risk of damage to optical disk drives. For example, RF transponder chips may be conveniently applied to the surface of already formed optical disks, e.g., using an RFID enabled label that is applied post-disk fabrication, thereby obviating the need to alter the disk fabrication process. However, this solution avails a nefarious person the opportunity of circumventing the anti-counterfeiting features of the RFID technology simply by peeling the label and accompanying RFID transponder off of the optical disk. Further, there is an ever-present risk that that the label substrate adhesive can, in some cases, transfer to the drive clamping mechanism, thereby potentially risking damage to the optical reader.

There thus remains a need to incorporate RFID technology into optical disks that can be activated at relative great distances, is tamper-proof, and minimizes the chance of damage to disk drives.

SUMMARY OF THE INVENTION

In accordance with a first aspect of the present inventions, an optical disk comprises a disk substrate having a hub and a metallicized annular data layer radially extending outward from the hub. In one embodiment, the disk substrate comprises an optically transparent base material, such as polycarbonate, so that the data layer can be optically read through the substrate. The optical disk further comprises a radio frequency identification (RFID) transponder affixed to the disk substrate, e.g., on the non-data carrying hub of the disk substrate. In one embodiment, the RFID transponder comprises a small integrated circuit (IC) chip, so that it can be more easily incorporated into the optical disk. The RFID transponder may also be passive, thereby obviating the need for a battery. To prevent tampering, the RFID transponder may be at least partially embedded into the disk substrate, so that removal of the RFID transponder from the disk substrate would, in effect, destroy the optical disk, and thus any value that it would have to its unlawful owner.

The optical disk further comprises an antenna electrically coupled to the transponder. The antenna comprises an electrically conductive antenna layer that is disposed over the metallicized data layer. In this manner, the effective size of the antenna can be increased by placing it above the relatively large data layer. The optical disk can comprise an electrically insulative layer (which may also function as a protective layer) formed between the metallicized data layer and the antenna layer in order to electrically isolate them from each other. In this manner, the antenna layer can be designed independently from the data layer. An additional protective layer can then be applied to the antenna layer. If the RFID transponder is carried by the hub, the optical disk can further comprise at least one pole lead extending from the transponder to a circumference of the hub adjacent the metallicized data layer, so that the antenna layer can be conveniently connected to the antenna lead(s). In one embodiment, the antenna layer is patterned to form at least one linear antenna element, e.g., a dipole element. In this manner, the length of the antenna can be tuned to the operating frequency of the signal.

In accordance with a second aspect of the present inventions, an optical disk comprises a disk substrate having a hub and an annular optical data region extending radially outward from the hub. In one embodiment, the disk substrate can have a similar construct as described above. The optical disk further comprises a transponder affixed to the disk substrate. The transponder can be the same as that described above and may be affixed onto the disk substrate in the same manner as that described above. The optical disk further comprises at least one linear antenna element coupled to the transponder, e.g., via pole lead(s), and extending within the data region. Thus, it can be appreciated that the size of the antenna element can be effectively increased by placing it within the relatively large data region of the optical disk, thereby providing the optical disk with a high-gain antenna.

In accordance with a third aspect of the present inventions, an optical disk comprises a disk structure and at least one antenna element arranged in the same manner as that described above. The optical disk further comprises a wafer carried by the hub, and a transponder, which may be similar to those described above, affixed to the wafer. In this manner, the transponder can be more easily integrated into the optical disk. The wafer may take the form of a ring that is concentrically arranged with the hub, thereby maintaining balance of the optical disk. The wafer may be at least partially embedded into the hub, so that the transponder is less apt to be tampered with. If the antenna element(s) extends within the optical data region, the optical disk can further comprise at least one pole lead, which may be affixed to the wafer and connected to the transponder. The antenna element(s) can then be electrically coupled to the transponder via the pole lead(s). The antenna element(s) may optionally be affixed to the wafer, although the size of the antenna element(s) will be limited by the smaller size of the hub.

In accordance with a fourth aspect of the present inventions, a method of identifying an optical disk is provided. The method comprises transmitting a radio frequency (RF) signal to the optical disk at a range of at least five feet, and preferably at a range of at least ten feet, and receiving an RF signal with an identification code (e.g., a unique number) from the optical disk in response to the transmitted RF signal, and processing the identification code. The activating RF signal can be transmitted by, and the identification RF signal can be received by, e.g., a handheld RF reader or a stationary RF reader. The identification code can be processed for many purposes, such as identifying the optical disk as a non-counterfeited optical disk, calculating a royalty, or tracking the location of the optical disk.

In accordance with a fifth aspect of the present inventions, a method of identifying a plurality of optical disks is provided. The method comprises transmitting activating radio frequency (RF) signals to the plurality of optical disks (e.g., at a range of at least five feet), and receiving identification RF signals with an identification code from the optical disks in response to the transmitted RF signals. As discussed above, a handheld RF reader or a stationary RF reader can be used for data collection. A data-collision avoidance technique can be employed to provide an ordered receipt of the RF signals from the optical disks. The method further comprises processing the identification codes as previously described above.

In accordance with a sixth aspect of the present inventions, a system of tracking optical disks is provided. The system comprises an RF reader configured for wirelessly receiving identification codes from a respective plurality of optical disks. The RF reader may be, e.g., hand-held or stationary. The RF reader may optionally employ a data-collision avoidance technique to provide an ordered receipt of the identification codes from the optical disks. The system further comprises one or more computers, e.g., an internet protocol (IP) server, configured for processing the identification codes to generate geographical location information relating to the optical disks, and a database for storing the location information. The geographical location information can be generated based on the physical location of the reader. If the computer(s) comprises an IP server, the system may optionally comprise another IP server configured for processing the identification codes and generating an IP address of the first IP server, so that the identification codes can be routed from the RF reader to the IP server over the Internet.

Other features of the present invention will become apparent from consideration of the following description taken in conjunction with the accompanying drawings.

BRIEF DESCRIPTION OF THE DRAWINGS

The drawings illustrate the design and utility of preferred embodiments of the present invention, in which similar elements are referred to by common reference numerals. In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Preferred embodiments of optical disks constructed in accordance with the present inventions will now be described. The optical disks described herein carry radio frequency identification (RFID) technology that can be easily and cheaply incorporated into standard optical disk fabrication processes and is capable of working at a range of a few millimeters, e.g., to prevent counterfeiting of the optical disks when detected by an radio frequency (RF) reader contained within an optical disk driver, or at a range of several feet, e.g., for tracking purposes during the supply of packaged optical discs. For the purposes of this discussion, an optical disk refers to any disk that carries a data region that can be optically read, such as any of the Compact Disk (CD) family of optical disks, including, but not limited to, CD-ROM, CD-R, and the like, as well as the Digital Video Disk (DVD) family of optical disks, including, but not limited to, DVD-ROM, DVD-R, and the like. Currently, the CD and DVD family of optical media have physical specifications of 12 centimeters in diameter by 1.2 millimeters thick, with a 1.6 centimeter hub opening. It can be appreciated that the size and dimensions of optical disks constructed in accordance with the present inventions can vary from these standards. Those skilled in the art will also appreciate that other storage media, including other optical storage media and non-optical storage media, may realize similar benefits in applying the present inventions.

Figure 1:
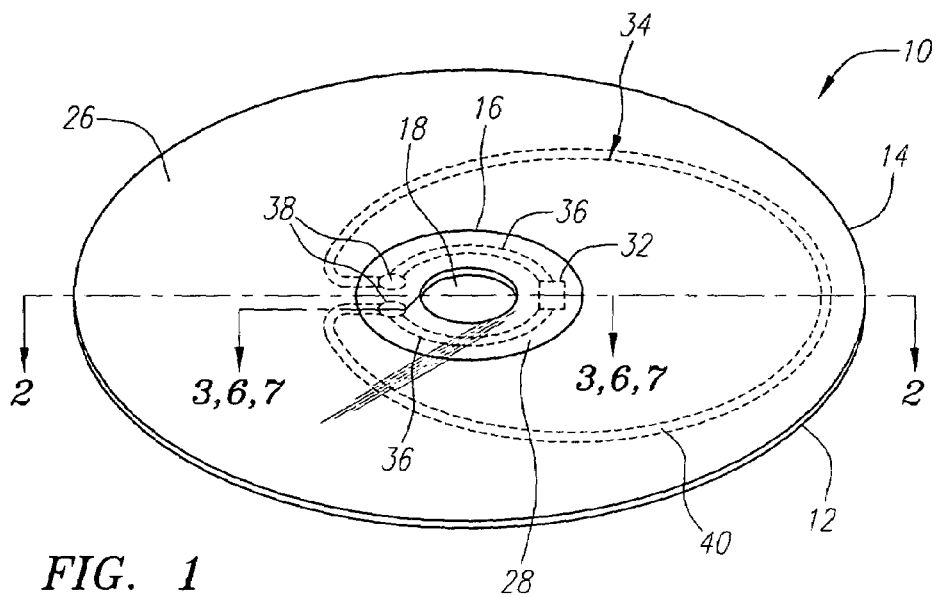
FIG. 1 is a perspective view of an optical disk constructed in accordance with a preferred embodiment of the present invention.
Figure 2:
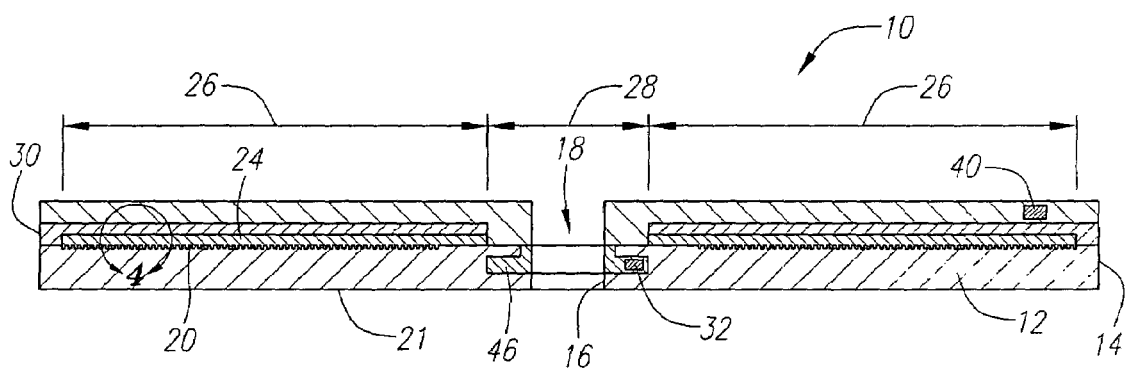
FIG. 2 is a cross-sectional view of the optical disk of FIG. 1, taken along the line 2-2.
Figure 3:
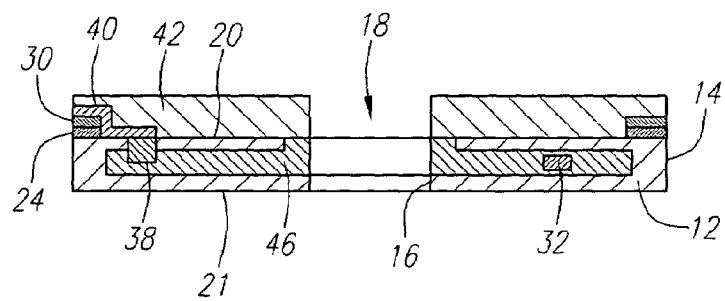
FIG. 3 is a cross-sectional view of one embodiment of the optical disk of FIG. 1, taken along the line 3-3.
Figure 4:
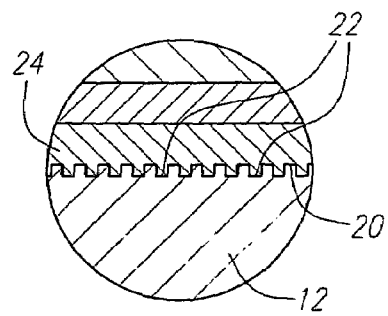
FIG. 4 is a magnified cross-sectional view of the optical disk of FIG. 2, taken along the line 4-4.

Referring to FIGS. 1-3, an exemplary optical disk 10 constructed in accordance with one preferred embodiment of the present inventions is provided. The optical disk 10 comprises a ring-shaped substrate 12 having an outer periphery 14 and an inner periphery 16 that defines a hub opening 18. The substrate 12 has a surface 20 (best shown in FIG. 2) on which various layers can be fabricated. It should be appreciated that the thicknesses of the layers are shown to be exaggerated for purposes of illustrated. In a practical implementation, however, the layers that are placed on the substrate 12 will typically be on the order of a few hundreds of a millimeter thick. As best shown in FIG. 4, optical data 22, which takes the form of tiny pits that can be optically read by a laser, are formed into one surface 20 of the disk substrate 12 in a spiral configuration. The optical data pattern will depend on the particular optical disk. For example, if the optical disk 10 is to be used in a DVD, the data will be stored in a tighter spiral pattern than data of a CD. The optical disk 10 further comprises a thin metal layer 24, such as aluminum, copper, or gold, which is disposed over the optical data 22 using a suitable process, such as physical vapor deposition (PVD), to form a metallicized data layer. So that a laser can read the optical data 22 from an opposite surface 21, the substrate 12 is composed of an optically transparent and rigid material, such as polycarbonate.

The metallicized data layer occupies a data region 26 of the disk substrate 12, which as in typical optical disks, occupies an annular area that is concentric with the disk substrate 12 and radially extends outward from a non-data carrying hub region 28 to a region just radially inward of the outer periphery 14 of the disk substrate 12. As with standard optical disks, the data region 26 has an inner diameter of approximately 4.125 centimeters and an outer diameter of approximately 11.75 centimeters. The optical disk 10 further comprises a thin optically transparent protective layer 30, such as acrylic or nitrocellulose, which is applied over the metal layer 24 using a suitable process, such as spin-coating, and then cured using suitable means, such as ultraviolet (UV) light exposure.

Until this point, a standard construction of an optical disk has been described. The optical disk 10 further comprises a radio frequency identification (RFID) transponder 32 that is carried by the disk substrate 12. In the illustrated embodiment, the RFID transponder 32 takes the form of a passive integrated circuit (IC) chip that transmits an RF signal containing an identification code via an antenna 34 in response to RF signals received from an RF reader, as will be described in further detail below. The RFID transponder 32 may optionally be capable of being written to. The RFID transponder 32 can be located anywhere on the disk substrate 12, but in the illustrated embodiment, is located in the hub region 28 of the disk substrate 12. The optical disk 10 further comprises a pair of electrically conductive pole leads 36 that are connected between a pair of positive and negative dipole antenna terminals (not shown) located on the RFID transponder 32 and a respective pair of antenna connections 38 to which the antenna 34 will be electrically connected.

The antenna 34 is carried by the relatively large data region 26 of the disk substrate 12, thereby allowing the size of the antenna 34 to be maximized. As such, the pole leads 36 extend from the RFID transponder 32 radially outward to a region adjacent the inner periphery of the data region 26 for coupling to the outerlying antenna 34 via the antenna connections 38. In the illustrated embodiment, the antenna 34 comprises a single linear antenna element 40, and in particular, a dipole antenna element, which is coupled between the respective antenna connectors 38 in a looped fashion. The length of the antenna element 40 will preferably be tuned to the operating frequency of the RFID transponder 32. In the illustrated embodiment, the antenna element 40 is directly connected to the antenna connections 38, but may also be capacitively coupled to the antenna connections 38 through a thin layer of non-conductive material (not shown), or alternatively the antenna connections 38 can be capacitively coupled to the pole leads 36 through a thin layer of non-conductive material.

Figure 5:
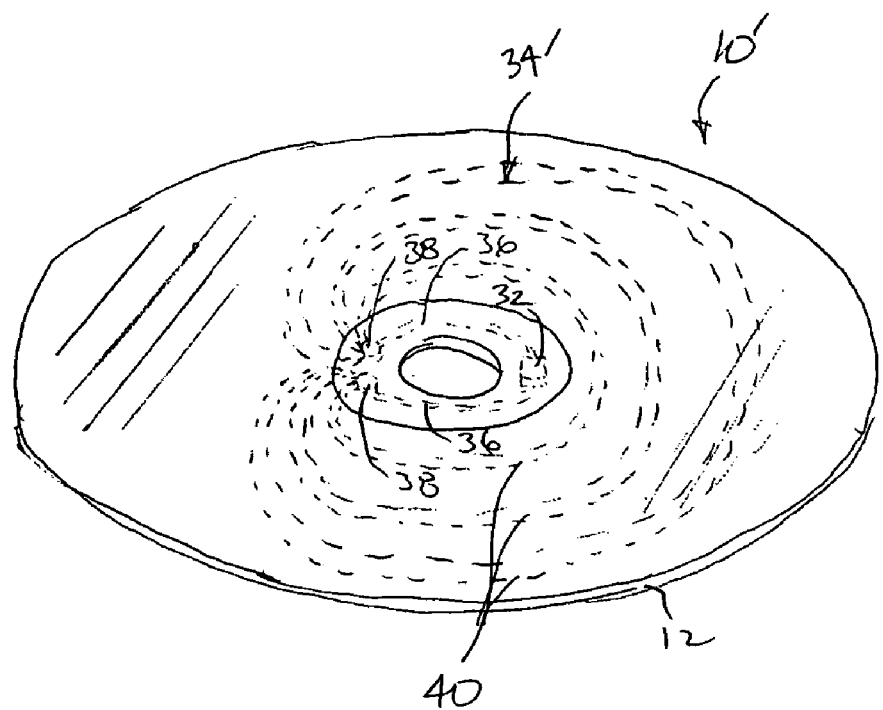
FIG. 5 is a perspective view of another optical disk constructed in accordance with an alternative embodiment of the present inventions.
Figure 6:
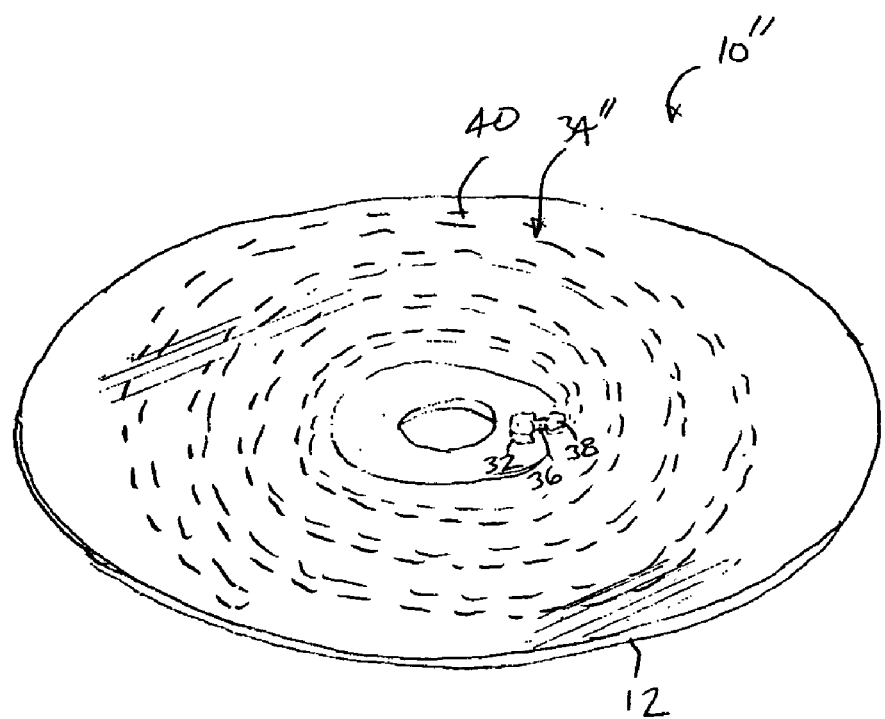
FIG. 6 is a perspective view of another optical disk constructed in accordance with an alternative embodiment of the present inventions.

It should be appreciated that any number of antenna elements can be formed onto the data region 26 of the disk substrate 12, depending on the particular design constraints and requirements. For example, as illustrated in FIG. 5, an alternative optical disk 10' comprises an antenna 34' with a plurality of dipole elements 40 connected between the respective antenna connections 38 in a looped fashion. As illustrated in FIG. 6, another alternative optical disk 10" comprises an antenna 34" with a single linear antenna element 40 can be formed into a spiral configuration and connected to a single antenna connection 38, which is turn, connected to a single terminal of the RFID transponder 32 via a pole lead 36. In either case, the antenna elements 40 are applied over the protective layer 30, which electrically isolates the antenna elements 40 from the underlying metal layer 24.

The antenna elements 40 are preferably formed as a patterned layer using a thin-film fabrication process. For example, an electrically conductive layer can be spin-coated over the protective layer 30, and an antenna pattern can be cut into the conductive layer using laser, mechanical, or chemical etching. Or the patterned layer can be formed by masking off regions of the protective layer 30 corresponding to the pattern of the antenna elements 40, spin coating an electrically conductive material over the masking, and then removing the masking. The antenna elements 40 can also be applied to the protective layer 30 via thin film metal sputter coating, hot foil stamping, printing highly conductive or semi-conductive ink (using screen printing, offset printing, or high resolution ink jet printing equipment), or other suitable techniques. Even more alternatively, the antenna elements 40 may be preformed and then suitably bonded to the protective layer 30.

Regardless of the method used to apply the antenna elements 40 onto the protective layer 30, the antenna elements 40 must be registered with the free ends of the pole leads 36. This can be accomplished using an automated, charged-coupled device (CCD) camera-based optical reading/positioning disc registration device (not shown) that identifies the antenna connections 38, and rotates the device that is used to apply the antenna elements 40 until the base of the antenna elements 40 are registered within the pole leads 36. In the illustrated embodiment, the antenna connections 38 are circular. It should be appreciated, however, that the antenna connections 38 can be formed in any predetermined shape that allows them to be optically registered.

The optical disk 10 comprises another thin optically transparent protective layer 42, such as acrylic or nitrocellulose, which is applied over the surface of the optical disk 10, including the RFID transponder 32, pole leads 36, antenna connections 38, and antenna elements 40, using a suitable process, such as spin-coating, and then cured using suitable means, such as ultraviolet (UV) light exposure. The optical disk 10 may include additional layers, such as a label that may be applied to the second protective layer 42 by a printer, or a hologram structure (not shown) fabricated by etching a hologram pattern into the second protective layer 42, and applying a metallic layer, such as copper, over the hologram etching. Additional optically transparent layers may be applied as necessary.

Figure 7:
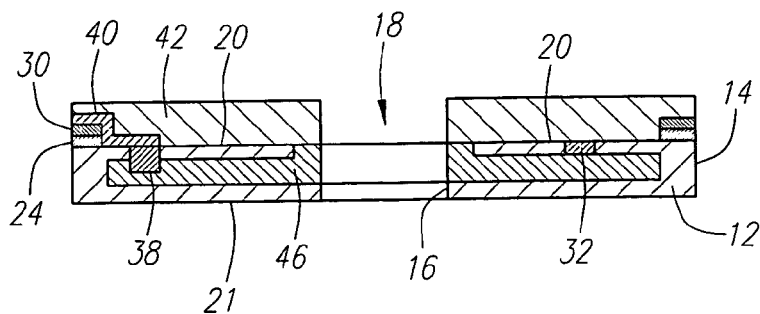
FIG. 7 is a cross-sectional view of another embodiment of the optical disk of FIG. 1, taken along the line 7-7.
Figure 8:
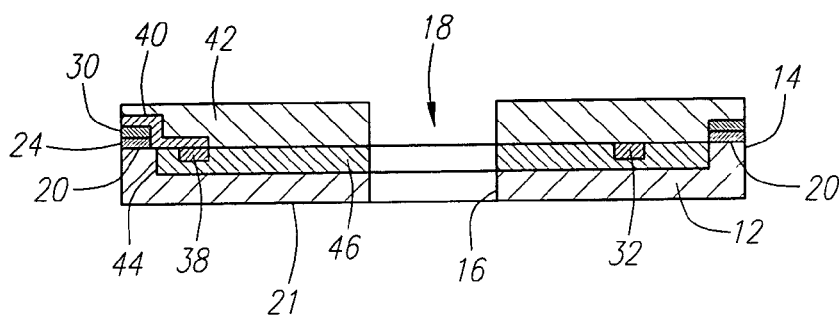
FIG. 8 is a cross-sectional view of another embodiment of the optical disk of FIG. 1, taken along the line 8-8.

Preferably, the RFID transponder 32 is at least partially embedded within the disk substrate 12, thereby discouraging removal of the RFID transponder 32 from the optical disk 10 for the purposes of avoiding the anti-counterfeiting features of the optical disk 10. That is, removal of the RFID transponder 32 from the disk substrate 12 would result in the description of the optical disk 10, and thus any value that it would have to its unlawful owner. As shown in FIG. 3, the RFID transponder 32 is fully embedded within the disk substrate 12 (i.e., the entire RFID transponder 32 is below the substrate surface 20 and above the substrate surface 21) to ensure that the optical disk 10 would be completely destroyed if the RFID transponder 32 were to be removed from the disk substrate 12. Alternatively, as shown in FIG. 7, the RFID transponder 32 can be partially embedded within the disk substrate 12, so that the top surface of the RFID transponder 32 is flush with the substrate surface 20. Or, as shown in FIG. 8, the RFID transponder 32 is not embedded within the disk substrate 12 at all, but rather is suitably mounted within an annular recess 44 formed within the hub region 28 of the disk substrate 12. In this case, however, the RFID transponder 32 can be potentially removed without damaging the optical disk 10, and thus, better lends itself to situations where counterfeit prevention is not a concern.

Notably, even if the pole leads 36 are removed from the optical disk 10, the RFID transponder 32 may still be activated by an RF reader at a relatively close range (few millimeters), such as that which occurs in an optical drive reader. Thus, the anti-counterfeiting feature of the optical disk 10 would still be intact even if the antenna elements 40 and RFID transponder 32 are electrically disconnected. As for the tracking benefits provided by the optical disk 10, because there is no foreseen motivation for any person that has access to the optical disk 10 within its supply chain to electrically disconnect the antenna elements 40 and RFID transponder 32, the pole leads 36 can be partially encapsulated, or not encapsulated at all, within the disk substrate 12 without major concern that the RFID technology incorporated into the optical disk 10 will be subverted. In particular, the pole leads 36 will extend from the encapsulated RFID transponder 32 to the substrate surface 20, where they can be connected to the antenna elements 40.

Figure 9:
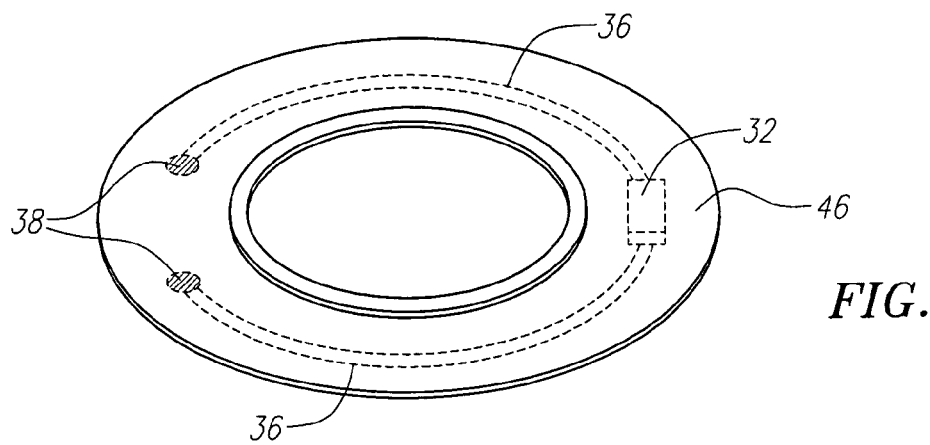
FIG. 9 is a perspective view of a wafer assembly used to incorporate radio frequency identification (RFID) technology into the optical disk of FIG. 1.

To facilitate positioning of the RFID transponder 32, pole leads 36, and antenna connections 38 during or even after fabrication of the disk substrate 12, the optical disk 10 comprises an optional ring-shaped wafer 46 for carrying these elements, as further illustrated in FIG. 9. As best shown in FIG. 3, the RFID transponder 32 is fully embedded within the wafer 46, whereas the antenna connections 38 are partially embedded within the wafer 46, with the top surface of the antenna connections 38 being flush with the surface of the wafer 46. Alternatively, the RFID transponder 32 can be partially embedded within the wafer 46 (FIG. 8) or merely bonded to the surface of the wafer 46 (FIG. 7). The RFID transponder 32, pole leads 36, and antenna connections 38 may be integrated into the wafer 46 using any suitable process, such as injection molding.

Figure 10:
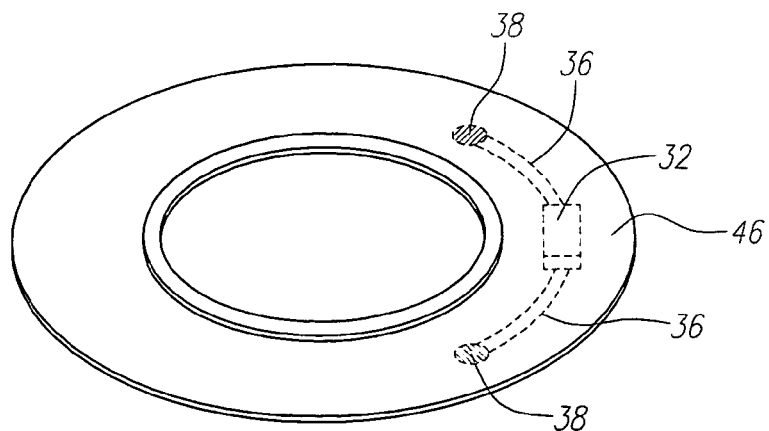
FIG. 10 is a perspective view of another wafer used to incorporate radio frequency identification (RFID) technology into the optical disk of FIG. 1.

To control the extent to which the RFID transponder 32 and antenna connections 38 are embedded within the disk substrate 12, the wafer 46 comprises an annular spacer 48 (unless the RFID transponder 32 and antenna connections 38 are not to be partially or fully embedded, as illustrated in FIG. 8), as will be described in further detail below. It should be noted that although the RFID transponder 32 and antenna connections 38 are arranged on opposite ends of the wafer 46, these components can be placed in any suitable geometric arrangement. For example, FIG. 10 illustrates an alternative arrangement, wherein the RFID transponder 32 and antenna connections 38 are generally placed on the same end of the wafer 46.

While many materials may be suitable for use as the wafer 46, such materials should not significantly increase the weight of the optical disk 10, such that the mass of the optical disk 10 falls outside of specific standards. Additionally, the wafer 46 should be constructed and placed on or in the optical disk 10 so as to no cause imbalance to occur when the disk 10 is rotated. For example, the base material of the wafer 46 may be composed of the same base material as the disk substrate 12, e.g., polycarbonate. Also, the thickness of the wafer 46 should be less than the total thickness of the optical disk 10, e.g., less than 1.2 mm.

The ring-shaped wafer 46 may additionally carry security features, such as encrypted, printed, serial numbers; digital fingerprints or watermarks; holograms; polarized filters, photo-luminescent coatings (detectable by specially tuned lasers); microscopic taggants, i.e., microscopic markers not found in the base material but added to the base material to indicate the object's origin or authenticity, to name just a few. Further details regarding the incorporation of a wafer within an optical disk 10 is described in U.S. patent application Ser. No. 10/463,559, entitled "Optical Storage Media with Embedded Security Device," filed Jun. 16, 2003, which is expressly incorporated herein by reference.

Figure 11:
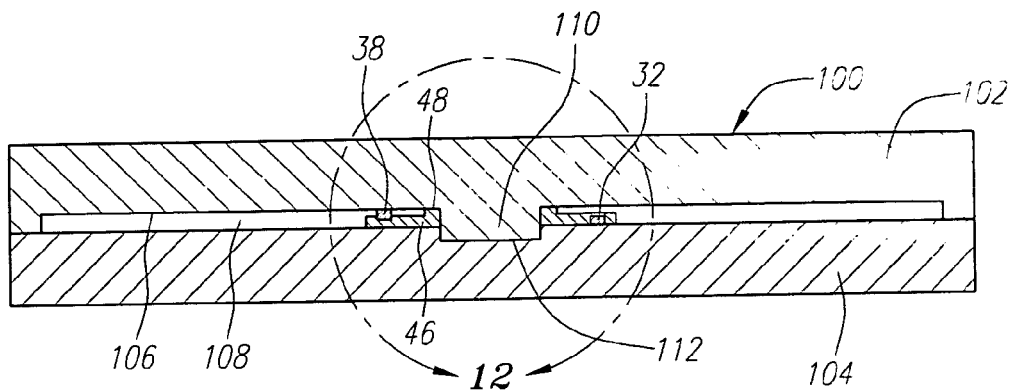
FIG. 11 is a cross-sectional view of a mold used to incorporate the wafer of FIG. 9 into a disk substrate of the optical disks of FIGS. 3 and 7.
Figure 12:
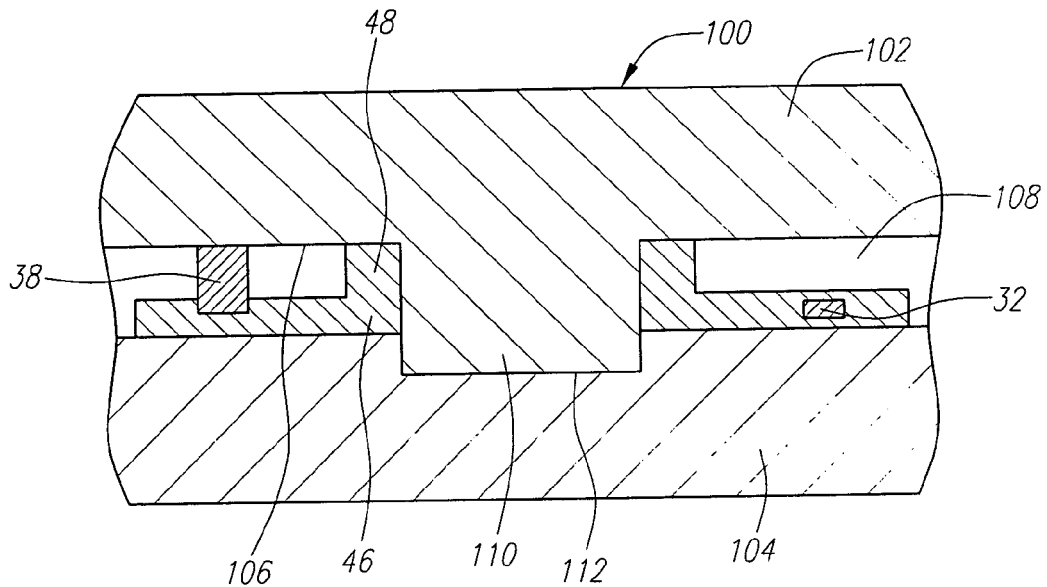
FIG. 12 is a magnified cross-sectional view of the mold of FIG. 11, taken along the line 12-12.

The wafer 46, along with the RFID transponder 32, pole leads 36, and antenna connections 38, can be integrated with the disk substrate 12 using any suitable process, but in the illustrated embodiment, are integrated using a molding machine. In particular, FIGS. 11 and 12 illustrate a mold 100 that can be used to form the disk substrate 12 with an embedded wafer 46, such as those illustrated in FIGS. 3 and 7. The mold 100 comprises two mold halves: a top mold portion 102 having an inner surface 106 that includes tiny protuberances (not shown) that will be used to form the optical data pits in the disk substrate 12; and a bottom mold portion 104 that forms an annular cavity 108 with the top mold portion 102 when the mold 100 is closed. The top and bottom mold portions 102, 104 respectively comprise a centering pin 110 and a recess 112 that mate with each other with the mold is closed. The centering pin 110 serves to create the hub opening 18, as well as properly position the wafer 46 within the mold 100, so that the wafer 46 is placed into a concentric relationship with the disk substrate 12.

In use, the wafer 46 is positioned onto the centering pin 110 of the open mold 100, which can be done manually or with a robotic arm, for example. The mold 100 is closed, and the cavity 108 is filled with a suitable base material, such as a liquefied polycarbonate material, using a suitable process, such as injection molding. The base material is then compressed in the mold 100 under multiple tons of pressure, e.g., using a hydraulic ram (not shown), so that the inner surface 106 of the top mold portion 102 forms the optical data pits into the molten base material. It can be appreciated that the spacer 48 forces the wafer 46 to the bottom of the annular cavity 108, thereby ensuring that it, along with the RFID transponder 32, will be fully encapsulated within the disk substrate 12. After the base material has been injected into the cavity 108 and compressed, it is then chilled and removed from the mold 100 as a disk substrate 12 with a partially or fully embedded RFID transponder 32. The previously described layers, and in particular, the metal layer 24, antenna layer 34, protective layers 30, 42, and optional label and holographic layers are then applied to the disk substrate 12.

Figure 13:
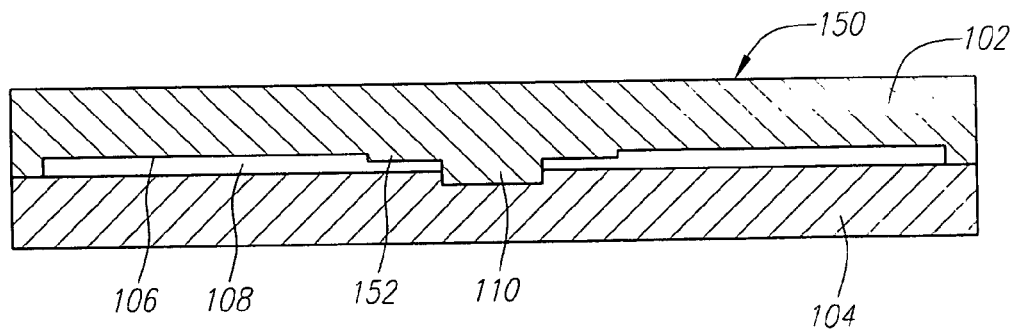
FIG. 13 is a cross-sectional view of a mold used to fabricate a disk substrate of the optical disk of FIG. 8.

FIG. 13 illustrates a mold 150 that can be used to form the disk substrate 12 with an annular recess 44 in which a wafer (without the annular spacer 48) can be mounted, such as that illustrated in FIG. 8. The mold 150 is similar to the previously described mold 100, with the exception that the top mold portion 102 comprises a shallow annular boss 152 from which the centering pin 110 extends. This annular boss 152 will form the annular recess 44 illustrated in FIG. 8. The height of the boss 152 preferably corresponds with the thickness of the wafer 46. The molding process is similar to the previously described molding process, with the exception that the wafer 46 is not placed on the centering pin 110. Instead, after the disk structure 12 has been formed and removed from the mold 100, the wafer 46 is bonded within the annular recess 44. Because the height of the recess 44 is commensurate with the thickness of the wafer 46, the surface of the wafer 46 will be flush with the substrate surface 20 in the data region 26, as illustrated in FIG. 8.

Further details describing the incorporation of wafers within optical disks are described in U.S. patent application Ser. No. 10/463,559, which has previously been incorporated herein by reference. Those skilled in the art will recognize that DVD disks are commonly formed by bonding two optical platters together. For example, the optical disk 10 described above can be bonded to a standard optical disk (i.e., a disk without the RFID technology) to create a DVD incorporated with RFID technology. For example, the bottom surface 21 of the optical disk 10, which functions as the top optical platter of the DVD, can be bonded to the top surface of another disk, which functions as the bottom optical platter of the DVD. In a standard manner, the metallic layer in the bottom optical platter will be semi-transparent, so that an optical disk drive can not only read the optical data in the bottom optical platter, but in the top optical platter as well.

Having described the structure and method of manufacturing the optical disk 10, a preferred method of tracking the optical disk 10 will now be described. The optical disk 10 can be easily and conveniently implemented into a supply tracking system. To this end, the RFID transponder 32 preferably complies with the worldwide regulations supporting the EPCglobal standardization for Ultra-High Frequency (UHF). EPCglobal supports the Electronic Product Code (EPC) Network as the global standard for immediate, automatic, and accurate identification of any item in the supply chain of any company, in any industry, anywhere in the world. The EPC is a unique number that identifies a specific item in the supply chain, and can be stored in a RFID device, such as the RFID transponder 32, which once retrieved, can be associated with dynamic data, such as from where an the item originated or the date of its production.

Figure 14:
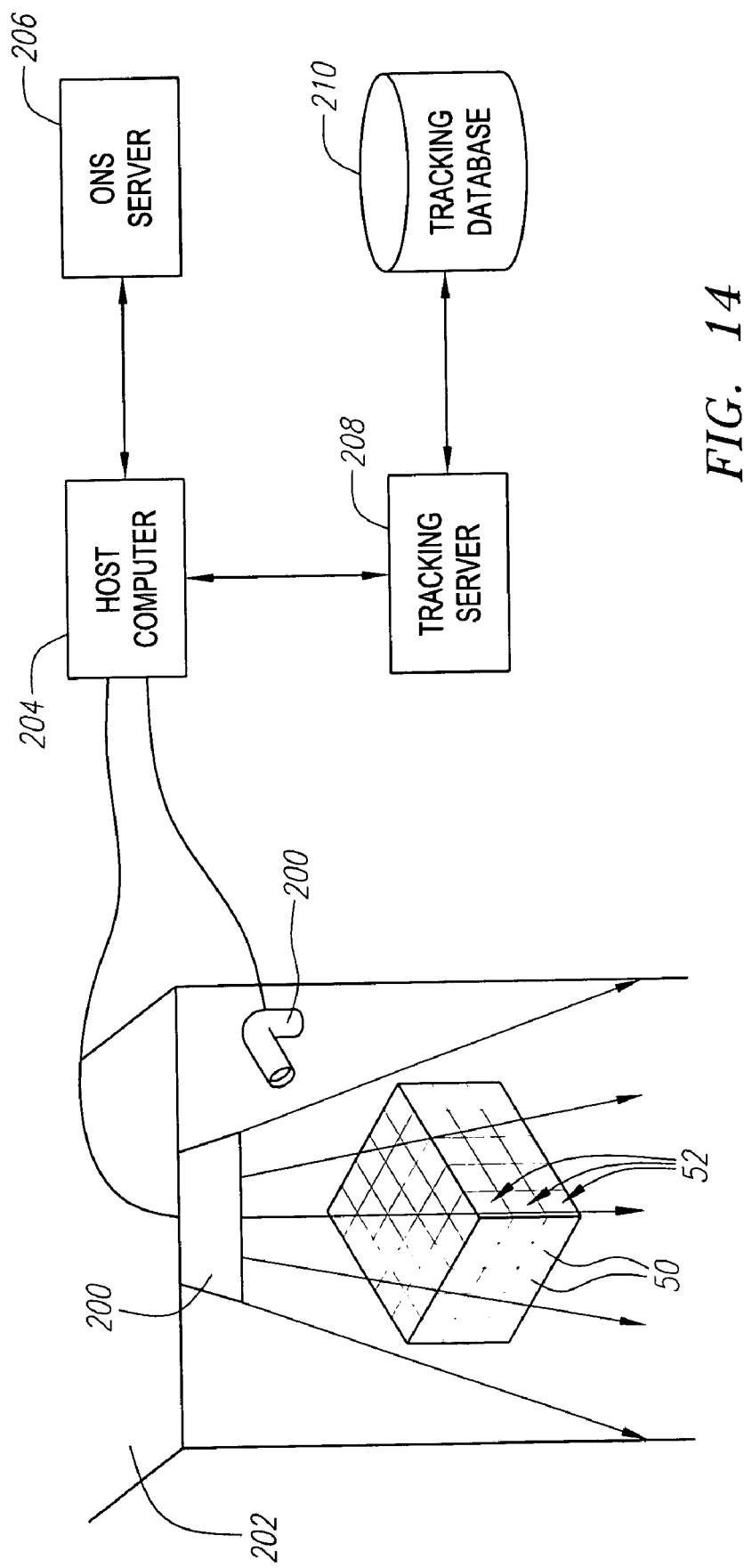
FIG. 14 is a block diagram of a tracking system using to track the optical disk of FIG. 1.

Thus, it can be appreciated that the incorporation of RFID technology into the optical disk 10 will allow it to be identified, counted, and tracked in a completely automated and cost-effective fashion. Presumably, the optical disk 10 has audio, video, or computer program content that is much more valuable than optical disk 10 itself. As illustrated in FIG. 14, the optical disk 10, along with other similar optical disks, can be packed into cases 50, which may feature their own RFID transponders, and then loaded onto palettes 52, which may also feature their own RFID transponders.

As the palettes 52 of optical disks leave one location, an RFID reader 200 transmits RF signals to the RFID transponders carried by the optical disks. The RFID reader 200 may be stationary, e.g., positioned in a fixed location, such as above a loading dock door 202 or a building, or may be hand-held. In any event, the RF signals are preferably transmitted at a range of at least five feet, and more preferably at a range of at least ten feet, so that the RFID transponders in all of the optical disks received the RF signals. In response, the RFID transponders transmit identification codes, and in particular their unique EPCs, back to the RFID reader 200. A data-collision avoidance technique is employed, so that the RFID reader 200 may receive the EPCs from the many RFID transponders in an orderly manner. In the illustrated embodiment, the RFID reader 200 sequentially switches each RFID transponder on and off until all EPCs have been read.

The EPCs are then transmitted from the RFID reader 200 to a host computer 204, which sends a query over the internet to an Object Name Service (ONS) internet protocol (IP) server 206, which, much like a reverse telephone directory, matches the EPC number to the address of a tracking IP server 208 that has extensive information about the product, and in this case, the optical disk that transmitted the EPC number. The host computer 204 then transmits the EPC number and the RFID reader 200 that read the EPC number to the tracking server 208, which stores the current location of the optical disk 10 (obtained from the information identifying the specific RFID reader 200) into a tracking database 210 that contains other comprehensive information related to the optical disks 10.

Once the palettes 52 of optical disks 10 arrive at another location, the EPCs are read by another RFID reader, and the process is repeated to store location information relating to the optical disks 10 in the tracking database 210. The tracking server 208 may optionally transmit routing information back to the second location, so that the optical disks 10 can be quickly efficiently routed to the next destination. Once the optical disks 10 arrive at their final destination, the tracking database 210 can be updated with this information.

It can be appreciated the a royalty calculation for the optical disks can be performed in a similar manner by obtaining the number of optical disks based on the number detected and multiplying it by the royalty. Counterfeiting detection can be performed by checking to see if the EPCs obtained from the optical disks are valid or checking to see if the optical disks respond with EPCs at all.

Although particular embodiments of the present invention have been shown and described, it will be understood that it is not intended to limit the present invention to the preferred embodiments, and it will be obvious to those skilled in the art that various changes and modifications may be made without departing from the spirit and scope of the present invention. Thus, the present inventions are intended to cover alternatives, modifications, and equivalents, which may be included within the spirit and scope of the present invention as defined by the claims.

What is claimed is:

1. An optical disk, comprising:
   a disk substrate having a hub and metallicized annular data layer, a hub portion of the disk substrate not extending into a metallicized data layer portion of the disk substrate, the metallized data layer portion radially extending outward from the hub;
   a radio frequency identification (RFID) transponder at least partially embedded in the disk substrate; and
   an antenna electrically coupled to the transponder, wherein the antenna comprises an electrically conductive antenna layer disposed over the metallicized data layer.

2. The optical disk of claim 1, wherein the disk substrate comprises an optically transparent base material.

3. The optical disk of claim 1, wherein the transponder comprises an integrated circuit (IC).

4. The optical disk of claim 1, wherein the transponder is passive.

5. The optical disk of claim 1, wherein the transponder is contained in the hub.

6. The optical disk of claim 5, further comprising at least one pole lead extending from the transponder to a circumference of the hub adjacent the metallicized data layer, wherein the antenna layer is connected to the at least one pole lead.

7. The optical disk of claim 1, further comprising a wafer contained in the hub, wherein the transponder is at least partially embedded into the wafer.

8. The optical disk of claim 1, wherein the transponder is completely embedded within the annular disk substrate.

9. The optical disk of claim 1, wherein the antenna layer is patterned to form at least one linear antenna element.

10. The optical disk of claim 1, wherein the antenna layer is patterned to form at least one dipole element.

11. The optical disk of claim 1, further comprising an electrically insulative layer formed between the metallicized data layer and the antenna layer.

12. The optical disk of claim 11, wherein the electrically insulative layer is a protective layer.

13. The optical disk of claim 1, further comprising a protective layer disposed over the antenna layer.

14. An optical disk, comprising:
   a disk substrate having a hub and an annular optical data region extending around the hub;
   a radio frequency identification (RFID) transponder at least partially embedded in the disk substrate; and
   at least one linear antenna element coupled to the transponder and extending within the data region.

15. The optical disk of claim 14, wherein the annular disk substrate comprises an optically transparent base.

16. The optical disk of claim 14, wherein the transponder comprises an integrated circuit (IC).

17. The optical disk of claim 14, wherein the transponder is passive.

18. The optical disk of claim 14, wherein the transponder is contained in the hub.

19. The optical disk of claim 18, further comprising at least one pole lead extending from the transponder to a circumference of the hub adjacent the data region, wherein the antenna layer is connected to the at least one pole lead.

20. The optical disk of claim 14, further comprising a wafer contained in the hub, wherein the transponder is at least partially embedded into the wafer.

21. The optical disk of claim 14, wherein the transponder is completely embedded within the annular disk substrate.

22. The optical disk of claim 14, wherein the at least one antenna element comprises a dipole element.

23. An optical disk, comprising:
   a disk substrate having a hub and an annular optical data region extending around the hub;
   a wafer at least partially embedded in the hub;
   a transponder affixed to the wafer; and
   at least one antenna element coupled to the transponder and being carried by the disk substrate in said data region.

24. The optical disk of claim 23, wherein the annular disk substrate comprises an optically transparent base.

25. The optical disk of claim 23, wherein the transponder is a radio frequency identification (RFID) transponder.

26. The optical disk of claim 23, wherein the transponder comprises an integrated circuit (IC) chip.

27. The optical disk of claim 23, wherein the transponder is passive.

28. The optical disk of claim 23, further comprising at least one pole lead affixed to the wafer and being electrically coupled to the transponder, wherein the at least one antenna element extends within the optical data region and is connected to the at least one pole lead.

29. The optical disk of claim 23, wherein the at least one antenna element is carried by the wafer.

30. The optical disk of claim 23, wherein the wafer includes a radio frequency identification transponder.

31. The optical disk of claim 23, wherein the wafer is fully embedded into the hub.

32. The optical disk of claim 23, wherein the at least one antenna element is a linear antenna element.

33. The optical disk of claim 23, wherein the at least one antenna element comprises a dipole element.

34. The optical disk of claim 23, wherein the wafer is a ring that is concentrically arranged with the hub.

35. A method of fabricating an optical disk, comprising:
positioning a transponder in an optical disk mold;
forming an optical disk with a data storage region and a hub in the optical disk mold, thereby embedding the transponder at least partially in the formed optical disk; and
applying an antenna element in the optical disk data storage region, wherein the antenna element is electrically coupled to the transponder.

36. The method of claim 35, wherein the optical disk is formed by injecting an optically transparent material into the disk mold.

37. The method of claim 35, wherein the transponder is a radio frequency identification (RFID) transponder.

38. The method of claim 35, wherein the transponder comprises an integrated circuit (IC) chip.

39. The method of claim 35, wherein the transponder is passive.

40. The method of claim 35, providing a wafer that carries the transponder, and positioning the wafer in the optical disk mold, wherein the wafer is at least partially embedded into the formed optical disk.

41. The method of claim 40, wherein the wafer carries the antenna element.

42. The method of claim 40, wherein the wafer is positioned in the optical disk mold, such that the wafer is concentrically arranged relative to the formed optical disk.

43. The method of claim 42, wherein the wafer comprises a ring, and the wafer is positioned on a centering pin of the optical disk mold.

44. The method of claim 42, wherein the wafer comprises a spacer, such that the transponder is prevented from being embedded flush with a surface of the formed optical disk.

45. The method of claim 42, wherein the antenna element is applied to the optical disk using a thin-film process.

46. The method of claim 42, wherein the antenna element is printed on the optical disk.

47. The method of claim 42, wherein the antenna element is applied to the optical disk in the data storage region.

* * * * *